United States Patent [19]
Onoguchi et al.

[11] Patent Number: 5,882,711
[45] Date of Patent: Mar. 16, 1999

[54] METHOD AND APPARATUS FOR FEEDING A DOUBLE-LAYERED FOOD PRODUCT

[75] Inventors: Kazuyoshi Onoguchi, Tokyo; Yoshibumi Otake; Nobuo Kajikawa, both of Utsunomiya, all of Japan

[73] Assignee: Rheon Automatic Machinery Co. Ltd., Tochigi Prefecture, Japan

[21] Appl. No.: 80,835

[22] Filed: May 18, 1998

[30] Foreign Application Priority Data

May 19, 1997 [JP] Japan ................................. 9-128475

[51] Int. Cl.⁶ ........................ A23P 1/12; A21C 11/16
[52] U.S. Cl. .................... 426/516; 426/496; 426/503; 426/512; 426/514; 426/518; 425/133.1; 425/308; 425/363
[58] Field of Search .................... 426/516, 518, 426/503, 496, 512, 514; 99/537; 425/133.1, 308, 363

[56] References Cited

U.S. PATENT DOCUMENTS

| | | | |
|---|---|---|---|
| 4,734,024 | 3/1988 | Tashiro | 426/516 X |
| 4,767,304 | 8/1988 | Tashiro | 426/518 X |
| 4,767,305 | 8/1988 | Tashiro | 426/518 X |
| 4,832,961 | 5/1989 | Aoki | 426/512 X |
| 4,882,185 | 11/1989 | Simelunas et al. | 426/516 X |
| 4,883,678 | 11/1989 | Tashiro | 426/516 X |
| 5,004,619 | 4/1991 | Kobayashi | 426/516 X |
| 5,153,010 | 10/1992 | Tashiro et al. | 426/287 |
| 5,223,277 | 6/1993 | Watanabe et al. | 425/132 |
| 5,518,391 | 5/1996 | Tashiro | 426/518 X |
| 5,558,896 | 9/1996 | Kobayashi | 426/516 |

FOREIGN PATENT DOCUMENTS

| | | | |
|---|---|---|---|
| 39-12276 | 7/1939 | Japan . | |
| 93/24025 | 9/1993 | WIPO | 426/516 |

OTHER PUBLICATIONS

The Operation Manual for Rheon Encrusting Machine (in Japanese), published Jan. 1969 (54 pages in length).

*Primary Examiner*—Milton Cano
*Attorney, Agent, or Firm*—Limbach & Limbach L.L.P.

[57] ABSTRACT

An apparatus for producing an elongated enveloped food product is disclosed. A rotary duct for feeding a filling is located in a ring form assembly of elongated rotary rollers for feeding a viscous casing material in a coaxial relationship so as to form the elongated product in which the casing material envelops the filling material. During the feeding of the casing material and the filling material, the rotary duct rotates within the cavity formed by the elongated rollers, while its outer surface is exposed to the viscous casing material. The duct has a scraper that rotates relative to the outer surface of the duct to scrape the viscous casing material from its outer surface to prevent the viscous casing material from sticking to the surface of the duct.

17 Claims, 7 Drawing Sheets

“METHOD AND APPARATUS FOR FEEDING A DOUBLE-LAYERED FOOD PRODUCT

FIELD OF THE INVENTION

This invention generally relates to a method and apparatus for feeding a double-layered food product, and, more particularly, to a method and apparatus for feeding a food product in which an outer material envelops an inner material.

BACKGROUND OF THE INVENTION

Various apparatuses have been devised heretofore to feed a product in which an inner viscous food material is enveloped with an outer viscous food material. One type of known apparatus is found and incorporated in the "Rheon Encrusting Machine," manufactured by the assignee of the present application. It is generally described in "The Operation Manual for Rheon Encrusting Machine," published in January 1969 by the assignee.

Such an apparatus includes a housing in which a plurality of vertical rollers mounted for rotation within the housing are arranged in a circular array. The axis of rotation of each of the rollers is tilted in one direction in such a way that an inner space surrounded by the rollers forms an inverted cone-shaped cavity for receiving the outer food material. The narrow bottom of the cavity is formed as an outlet defined by the lower ends of the rollers. The outer material received within the cavity is fed to the outlet while the outer material rotates in the cavity by the rotation of the rollers. The apparatus also includes a vertically extending rotary duct, which is rotatably placed in the center of the cavity, for rotatingly feeding the inner food material. The bottom of the duct forms an outlet, which is aligned with the roller-cavity outlet in a coaxial relation. An adhesion section for causing the peripheral surface of the inner food material to be able to adhere to the inner surface of the outer food material is formed between the two outlets. At the adhesion section, the rotating velocity of the inner food material relative to the outer food material can be reduced, since the duct can rotate.

In operation, the operator feeds a desired mass of the outer food material into the cavity. The outer material thus deposited within the cavity is then downwardly fed through the adhesion section and then is made to pass through the cavity outlet by the rotation of the rollers. Simultaneously, the inner material is fed to the adhesion section through the duct and its outlet, with the inner food material rotating together with the duct. Since the outer food material and the inner food material are viscous, the inner surface of the outer food material adheres to the peripheral surface of the inner material with the help of the rotation of the outer food material at the adhesion section.

As the result, the bonded outer food material and inner food material form a unified body and are downwardly extruded from the apparatus as an elongated product in which the outer material envelops the inner material.

One problem faced in the production of the enveloped product in the prior art is that the outer surface of the duct sticks to the outer food material. The result of this is a build-up of the outer material on the outer surface of the duct which interferes with the effectiveness of the feeding of the outer material from the cavity to the adhesion section. Hence, the prior-art apparatus is faced with a decrease in the productivity of the enveloped product. This problem may often occur where the outer material is a highly viscous material, such as a rice-based material.

Accordingly, there is, a need in the art for a feeding apparatus that has a more enhanced productivity of the enveloped product, and which is applicable to an outer food material having a high viscosity.

SUMMARY OF THE INVENTION

In view of the foregoing, one object of the present invention is to provide a method for feeding a double-layered enveloped product without the sticking problem in the prior art.

Another object of the present invention is to provide a food product feeding apparatus that can feed an elongated double-layered product, in which an outer food material cylindrically envelops an inner food material in a way that does not substantially contribute to an undesirable build-up of the outer food material within the apparatus.

It is an additional object of the present invention to provide an apparatus in which the forgoing food product feeding apparatus is adapted to produce from the enveloped product spherical products with the outer food material encrusting the inner food material.

In one aspect of the invention, there is provided an apparatus for feeding a cylindrical enveloped food product in which an outer material cylindrically envelops an inner material, wherein the inner and outer materials are viscous food materials. This apparatus comprises first and second feeding means. The first feeding means, which has an outlet located at the lower end thereof, is adapted to receive the outer material and to feed the outer material to the outlet. The outer material is rotated within the first feeding means while it is fed to the outlet. The second feeding means is received within the first feeding means, and is tubular. It has an outlet surrounded by the lower part of the first feeding means so that the two outlets are in a substantially coaxial relation, and is adapted to feed the inner material to the outlet. The inner material is rotated within the second feeding means while being fed to the outlet. In this aspect of the invention, the apparatus further comprises scraping means for scraping the outer material from its outer surface. This scraping means rotates relative to the outer surface of the second feeding means. The apparatus further comprises means for adjusting the rotating velocity of the inner material relative to the rotating velocity of the outer material. The apparatus also comprises means for causing the outer material from the outlet of the first feeding means to adhere to the inner material from the outlet of the second feeding means by utilizing their viscosity. The adhesion means forms the cylindrical enveloped product in which the outer material cylindrically envelops the inner material in a substantially coaxial relation. The enveloped product is extruded from the adhesion means.

Further, in accord with this aspect of the invention, the apparatus may comprise means for cutting the cylindrical enveloped product so as to form a plurality of spherical products wherein in each one the outer material encrusts the inner material.

In another aspect of this invention, there is a method for feeding and extruding a cylindrical enveloped food product in which an outer material cylindrically envelops an inner material, wherein the inner and outer materials are viscous food materials. In this aspect of the invention, the method comprises steps of feeding the outer and inner materials. The outer material is fed while being rotated in a rotating feeding means. The inner material is fed while being rotated in a rotating duct. This duct includes at least a portion located in the rotating first feeding means, wherein the outer surface of the portion is in contact with the outer material when the outer material is fed. During the step for feeding the outer and inner materials, the outer material is scraped from the outer surface of the portion of the rotating duct. In this method, the rotating velocity of the inner material relative to the rotating velocity of the outer material can be adjusted. The outer material adheres to the inner material because of their viscosity so as to form a cylindrical enveloped product in which the outer material envelops the inner material in a substantially coaxial relationship. Then, the cylindrical enveloped product is extruded.

BRIEF DESCRIPTION OF THE DRAWINGS

The foregoing and other objects, features, and advantages of the present invention will be further understood from the following detailed description of the preferred embodiments and practices thereof and from the accompanying drawings in which.

DETAILED DESCRIPTION OF THE PREFERRED EMBODIMENT

Figure 1:
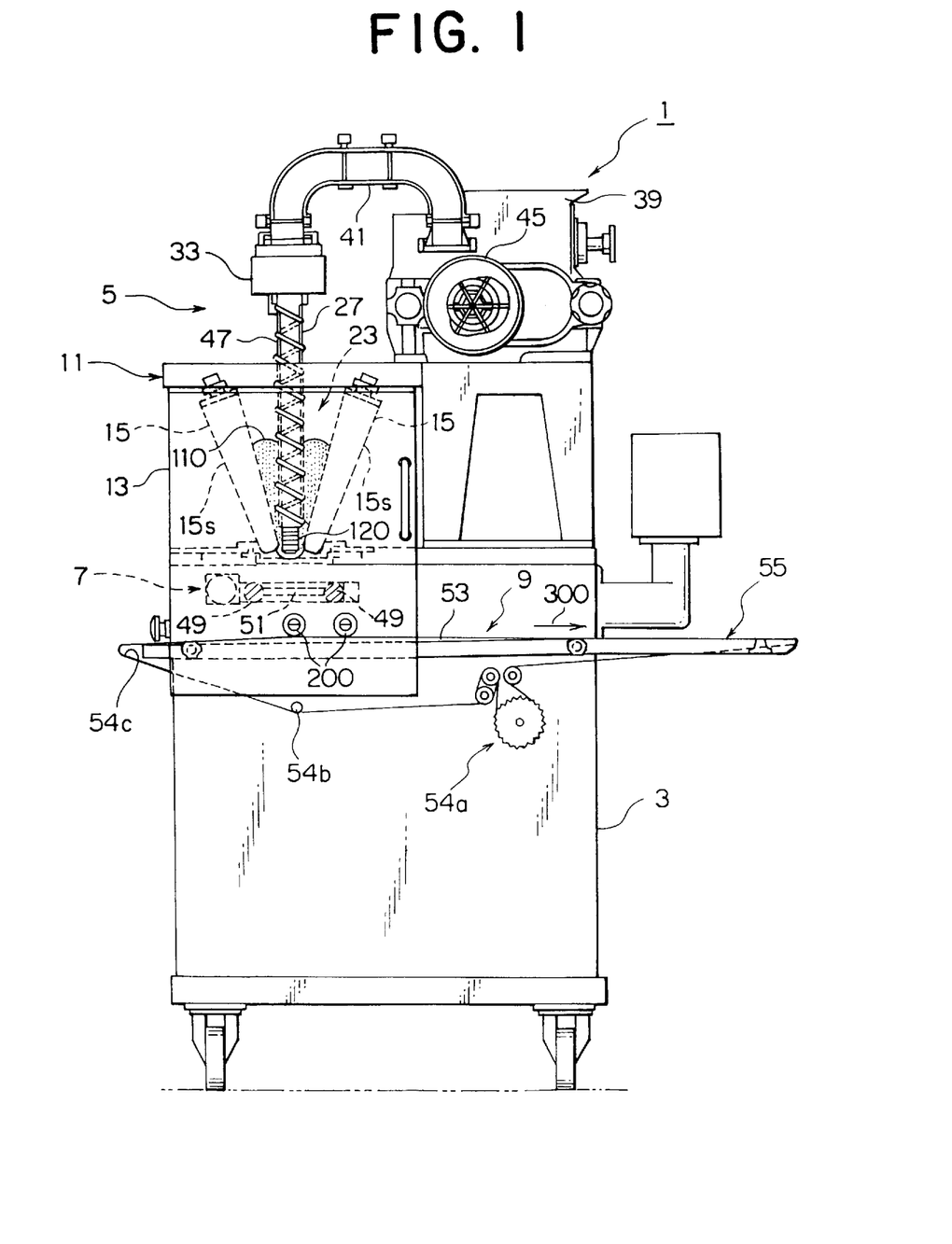
FIG. 1 illustrates an encrusting apparatus embodying the present invention in elevation, partly in section.
Figure 2:
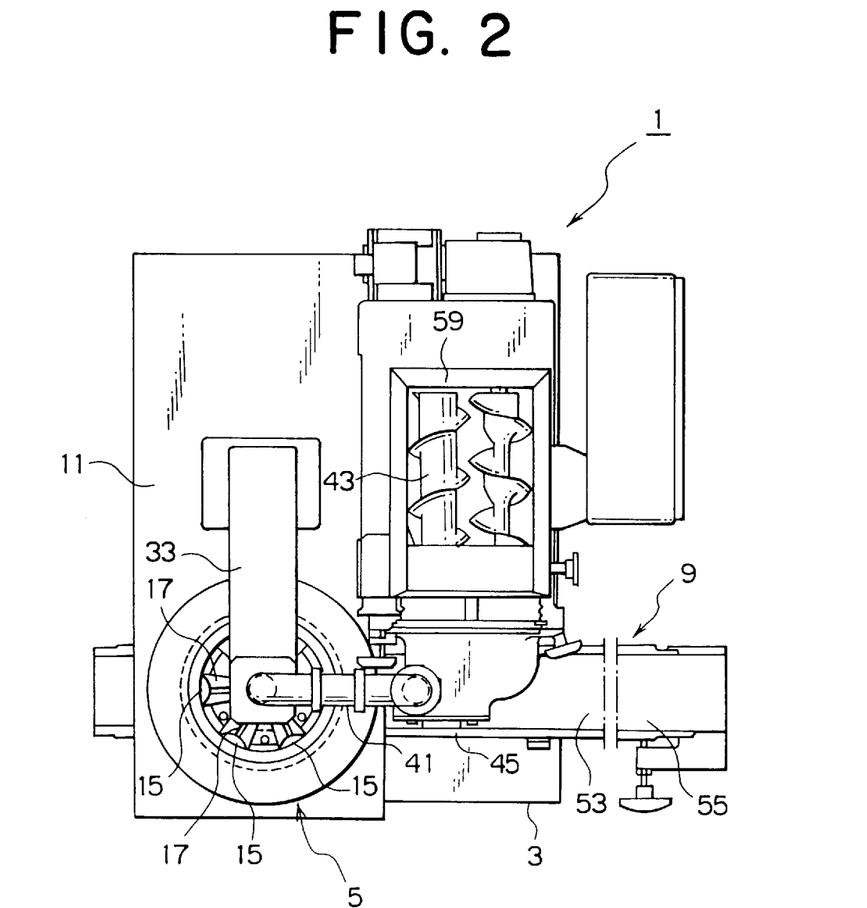
FIG. 2 is a top view of the apparatus shown in FIG. 1.

Referring now to FIGS. 1 and 2, an encrusting apparatus embodying the present invention, generally indicated at 1, is used to continuously produce double-layered products 200. The encrusting apparatus 1 comprises, as basic components, a main housing 3, in which are mounted a food feeding apparatus 5, a cutting apparatus 7 provided below the feeding apparatus 5, and a conveyor apparatus 9 located below the cutting apparatus 7.

The food feeding apparatus 5, whose upper portion is outside the main housing 3, is used to feed an elongated product 100. The product 100 is substantially bar-shaped product and consist of two layers: an outer food material (referred to as a "casing material") 110 and an inner food material (referred to as a "filling material") 120 enveloped with the casing material 110. The final product 200 produced by the encrusting apparatus 1 is made from the elongated product 100 with a cutting process. The product is substantially spherical and double-layered, but can take various forms, such as a dumplings, arancini, or other rice-based products. In the present invention, the casing material 110 is a viscous food material, such as rice dough, wheat dough, or the like, while the filling material 120 is a viscous food material, such as bean paste, fish paste, meat, cheese, a viscous vegetable, or the like. If the final product 200 is the arancini, the casing material 110 is made of a rice dough, while the filling material 120 may include chunks of spiced beef, diced mozzarella cheese mixed with bechamel sauce, etc.

It is recognized that the term "final product" in the specification does not always mean an end product ready for consumer use, but may merely mean an encrusted food product that has a substantially spherical, hemispheric, or like form. Those of skill in the art will understand that any cooking process, for example, heating, steaming, and other cooking processes, can be applied to the product produced by the encrusting apparatus 1.

Figure 3:
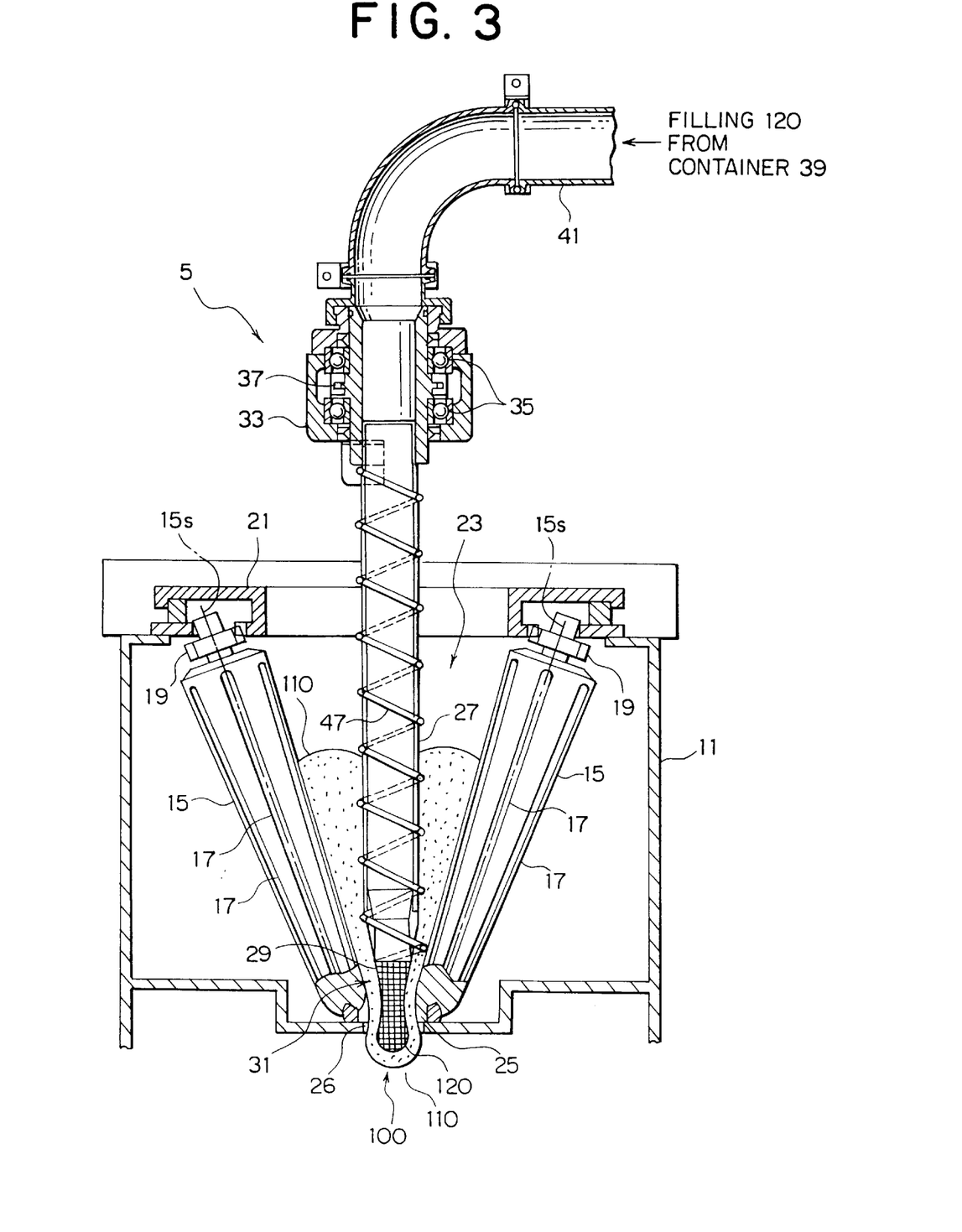
FIG. 3 is an enlarged detailed vertical sectional view of a food feeding apparatus, of this invention, which includes the circularly arrayed rollers shown in FIG. 1.
Figure 4:
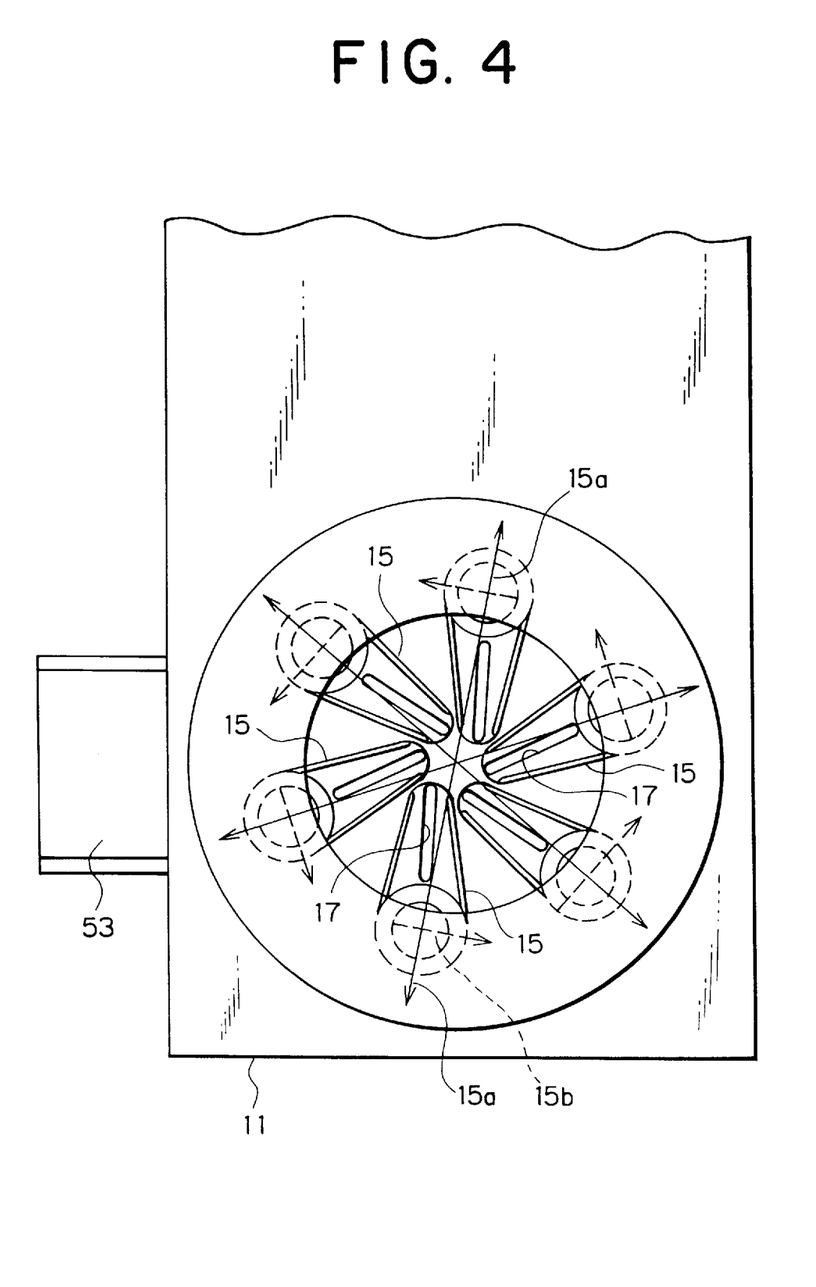
FIG. 4 illustrates a schematic plane view of the rollers shown in FIG. 3, and also illustrates modified arrangement of the circularly arrayed rollers shown in FIG. 3.

The food feeding apparatus 5 includes a sub-housing, generally indicated at 11, provided above the main housing 3, on the left side in FIG. 1. Referring to FIGS. 3 and 4 in greater detail, the sub-housing 11 has a front door 13 for the operator to have access to the inside of the sub-housing, as, e.g., to supply the material for the casing material 110 to a cavity 23 (described below). The feeding apparatus 5 also includes an outer feeder for feeding and rotating the casing material 110 and an inner feeder for feeding and rotating the filling material 120.

The outer feeder comprises a plurality of vertical-type rollers 15 with an associated driving mechanism. The rollers 15, e.g., six in number, are essentially structurally equivalent to one another, and are arranged in a substantially circular array at substantially regular intervals in the sub-housing 11. An inner space surrounded by the rollers 15 forms the cavity 23 for receiving the material for the casing material 110. The wide open top of the cavity 23 forms an opening for receiving the material for the casing material 110, defined by the top ends of the rollers 15. The narrow bottom of the cavity 23 is formed as an outlet 25 defined by the lower ends of the rollers 15. The outlet 25 communicates with an opening 26 in the bottom of the sub-housing 11. Attached to the upper end of each roller 15 is a drive gear 19 that engages a single, ring-shaped driving gear 21 rotatably mounted to the upper side of the sub-housing 11. This driving gear 21 is used to drive the plurality of driven gears 19 and is drivingly connected to a motor (not shown) for the purpose of synchronously rotating the rollers 15 in the same direction. The mass of the material for the casing material 110 received in the cavity 23 rotates therein and is fed to the outlet 25 when the rollers 15 rotate.

As shown in FIGS. 1, 3, and 4, an axis 15s of each roller 15 is preferably inclined in an outer direction indicated by solid-line arrows 15a in FIG. 4, such that the cavity 23, which is surrounded by the rollers 15, takes a substantially inverted cone form. This arrangement is to obtain a downward thrust acting on the material for the casing material 110 from the rollers is while they are rotated. As the result, it helps the feeding of the material for the casing material 110 within the cavity 23 to an adhesion section 31 (described below) and through the opening 26. To further facilitate this feeding of the material for the casing material 110, it is understood that each roller axis 15s is also inclined in a direction perpendicular to the direction of outward inclination 15a, i.e., in the counterclockwise direction indicated by the dotted arrows 15b in FIG. 4.

As best shown in FIG. 3, it will also be understood that each roller 15 has a cone-shaped form whose upper end has a radius greater than that of the lower end, in order to reduce any twisting motions of the casing material 110 within the cavity 23. This means that any undesired stirring of the casing material 110 within tie cavity during its downward transfer by the rollers 15 can be prevented. In other words, the quality of the elongated cylindrical product 100 from the feeding apparatus 5 can be enhanced.

As shown in FIGS. 3 and 4, it will be understood that each roller 15 has a plurality of elongated slots 17 provided on a peripheral surface along the longitudinal direction of the roller 15. It is useful to prevent the casing material 110 from slipping on the rollers 15 when they are rotated. It enables the casing material 110 to be moved and effectively rotated by the rotation of the rollers, and facilitates the adhesion of the casing material 110 and the filling material 120 at the adhesion section 31. As the result, the productivity of the number of the elongated products 100 can be increased.

As further seen in FIG. 3, the inner feeder includes a rotary duct 27 and its driving mechanism. The rotary duct 27 extends downward into the sub-housing 11 and trough the inner cavity 23. The lower end of the duct 27 forms an outlet 29. The upper end of the rotary duct 27, which is outside the sub-housing 11, is journaled by a bearing assembly 35, which is fitted in a supporting arm 33, which is provided above the sub-housing 11. The upper end of the duct 27, at the supporting arm 33, is also provided with a driven sprocket (or driven gear) 37, which is drivingly connected to a motor (not shown) for driving the duct 27. The peripheral surface of the outlet 29 of the duct 27 is surrounded by the inner surfaces of the parts of the rollers, near their bottom ends. The outlet 29 is vertically aligned with the outlet 25 of the cavity 23 formed by the lower ends of the rollers 15.

The adhesion section 31 is formed between the inner surface of the outlet 25 and the peripheral surface of the outlet 29. At the adhesion section 31, the rotating velocity of the filling material 120 can be reduced relative to the casing material 110. The reduction can include the case where the relative rotation velocity is zero, since the inner feeder and the outer feeder have separate driving mechanisms which can be independently adjusted.

Returning to FIG. 1, a container 39 is mounted on the main housing 3 (shown on the right side of the drawing), to contain the filling material 120 to be fed to the duct 27. The container 39 and the duct 27 are connected via a line 41, one of whose ends is rotationally connected to the duct 27 at the supporting arm 33 in a generally end-to-end relationship.

Referring to FIGS. 1 and 2, a screw feeder 43, which is provided within the container 39, and a pump 45, which is mounted near the container, are arranged so that they can feed a mass of the filling material 120 through the line 41 to the duct 27.

Referring to FIGS. 1 and 3, a scraper 47 is secured to the lower end of the supporting arm 33. The scraper 47 preferably has a spiral configuration and extends downward and is spirally wound around the peripheral surface of the duct 27 in a close or frictional contact relation, for scraping the casing material 110 from the surface of the duct 27. Since the scraper 47 is secured to the supporting arm 33, the scraper itself cannot rotate relative to the arm 33. However, this stationary scraper 47 may be considered as a movable scraper that can rotate relative to the peripheral surface of the duct 27 during its rotation.

Note that the scraper 47 of the preferred embodiment of the invention has a spiral configuration, to provide a downward thrust acting on the casing material 110 by the rotation of the scraper 47 relative to the peripheral surface of the duct 27. The pitch of the scraper 47 may progressively increase from the upper portion of the scraper to the lower portion of the scraper, so as to progressively increase the downward thrust acting on the casing material 110.

Referring to FIG. 1, the cutting apparatus 7, which is located below the outlet 25, is essentially structurally equivalent to a cutting apparatus described in U.S. Pat. No. 5,223,277, issued to Watanabe et al., and assignes to the same assignee of the present application. The disclosure of this U.S. patent is incorporated herein by reference.

Figure 5:
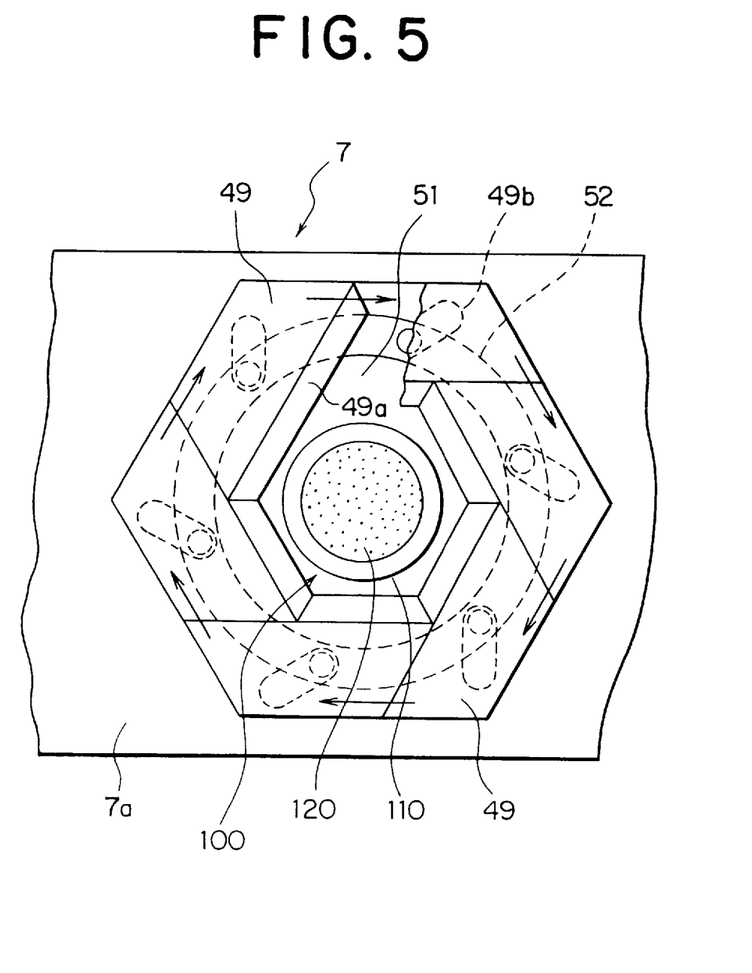
FIGS. 5, 6, and 7 are plan views of the cutting members shown in FIG. 1, and their positional relationships before, during, and after one cycle of their sliding movements, respectively.
Figure 6:
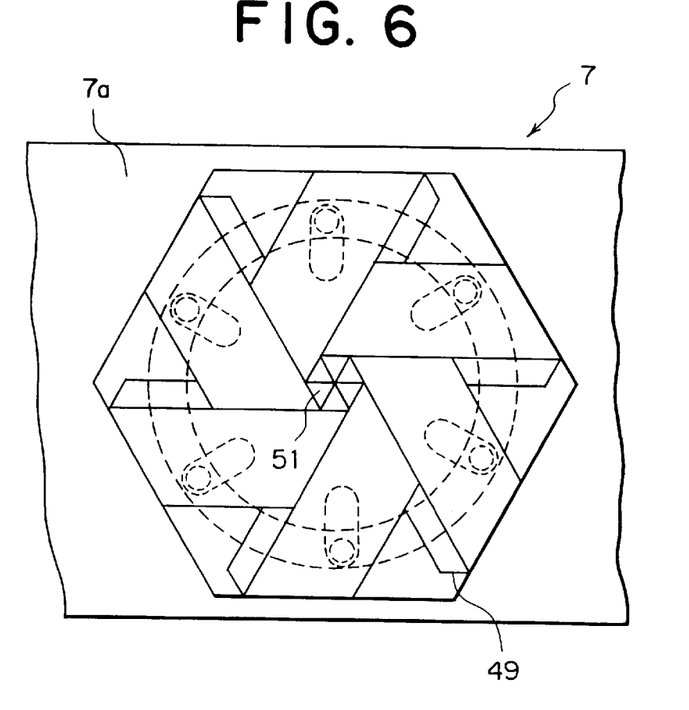
Figure 7:
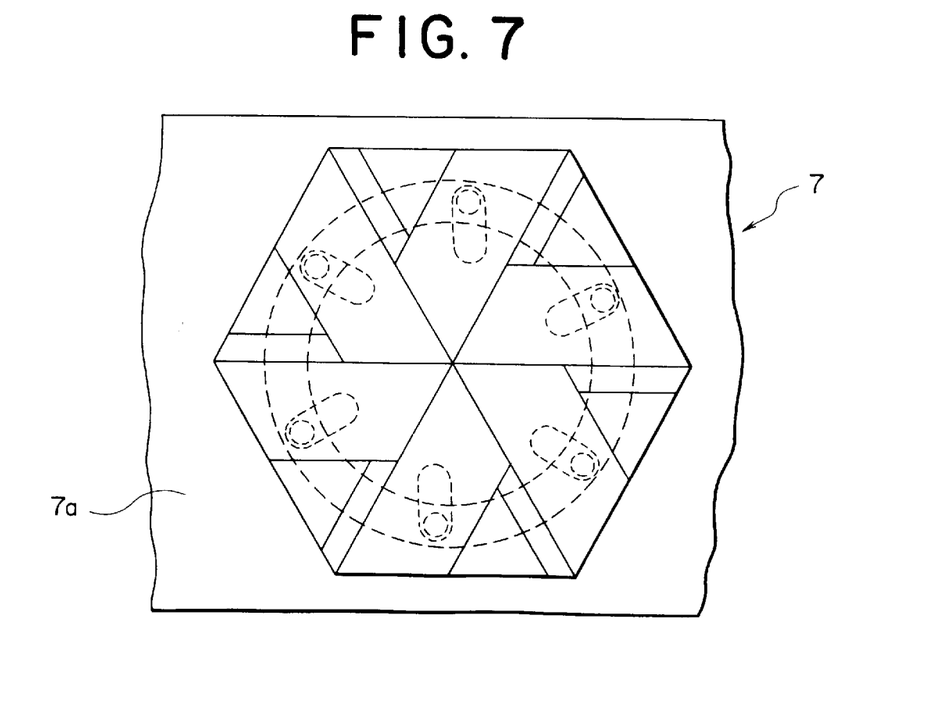

As shown in FIG. 5, the cutting apparatus 7 includes a housing 7a, which received at least three, or e.g., six, circumferentially arranged cutting members 49 to form a central opening 51 surrounded by them. Each cutting member 49 has at least two cutting surfaces, which include upper and lower cutting surfaces 49a (only the upper cutting surfaces are illustrated in FIG. 5), and an elongated hole 49b, which is formed in the bottom thereof. On the bottom of the housing 7a, a driving ring 52 (shown in FIGS. 5–7 by dotted lines) is mounted to cause the cutting members 49 to slide over other each. The driving ring 52 is drivingly connected to a suitable driving mechanism (not shown), which is adapted to rotate the driving ring. Driving pins are fixed to the driving ring 52 with a predetermined distance between adjacent pins, and slidably engage the elongated holes 49b of the cutting members 49. The cutting members 49 are assembled in sliding contact with each other. When the driving ring 52 is rotated by the driving mechanism, it causes the cutting members to move, so that the sliding surfaces of adjacent cutting members are slidable along each other so as to open or close the opening 51.

The positional relationship of the cutting members 49 shown in FIG. 5 is before a cycle of their sliding movement starts. During the cycle, the cutting members 49 are moved in the clockwise direction shown by arrows in FIG. 5, and they slide on each other and decrease the area of the opening 51. They then take the position shown in FIG. 6. Then the cutting members 49 are further moved in the clockwise direction from the position in FIG. 6 to the position shown in FIG. 7, whereupon the opening 51 is completely closed. When the cutting members 49 are moved in the counter-clockwise direction from the position in FIG. 7, the area of the opening 51 is increased.

Figure 8:
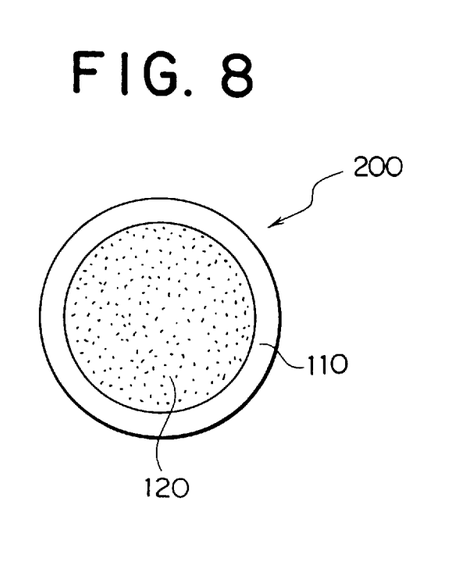
FIG. 8 is a cross section of a product, in which a filling is encrusted with a casing, produced by the apparatus of the present invention.

In the forgoing way, the opening 51 is opened and closed to cut the elongated cylindrical product 100 that is extruded from the opening 26 and that passes through the opening 51 to produce the rounded encrusted products 200, in each of which the filling material 120 is encrusted with the casing material 110, as shown in FIG. 8.

The conveyor apparatus 9 shown in FIGS. 1 and 2 is a conventional, horizontal belt-type conveyor apparatus, and may generally comprise a continuous belt 53 entrained around a driver member 54a, an idler roller 54b, and a guide 54c. The products 200, which are fed from the cutting apparatus 7, then rest on the belt 53 that moves in the direction indicated by an arrow 300. The products 200 may be released at the product take-out station 55 on the continuous belt 53, near the leading edge thereof, which is outside the main housing 3. Many suitable means (not shown) for releasing the products 200, either a manual type or an automatic type, may be provided at or adjacent the station 55.

To operate the apparatus in accordance with the present invention, the operator feeds a desired mass of the casing material 110 into the cavity 23 within the feeding apparatus 5. Since the casing material 110 is viscous, the mass of the casing material can be received in the cavity 23 surrounded by the rollers 15, regardless of the intermittent arrangement of the rollers.

When the apparatus 1 is energized by a power supply (not shown), the motor starts rotating the rollers 15. The casing material 110 within the cavity 23 is then downwardly fed to the adhesion section 31 and passes through the outlet 25 by the rotation of the rollers 15 while the casing material rotates within the cavity. The filling material 120, which is within the container 39, is fed to the duct 27 via the line 41 by the screw feeder 43 and the pump 45 The motor for driving the duct 27 rotates the duct, and the filling material 120, which is within the duct, is then downwardly fed to the adhesion section 31 and passes through the outlet 29 by the rotation of the duct while the inner material 120 rotates within the duct.

At the adhesion section 31, the casing material 110, which is extruded from the outlet 25 of the cavity 23, has a cylindrical configuration, while the filling material 120, which is extruded from the outlet 29 of the duct 27, has a bar-shaped configuration and is surrounded by the cylindrical casing material 110. Since the casing material 110 and the filling material 120 are viscous, the inner surface of the cylindrical casing material 110 adheres to the peripheral surface of the bar-shaped filling material 120, assisted by the rotation of the casing material 110 at the adhesion section 31. Furthermore, this adhesion is facilitated because the slippage between the inner surface of the casing material 110 and the peripheral surface of the filing material 120 is small because the rotation velocity of the filling material 120 relative to the casing material 110 is reduced, as mentioned above. As a result, the casing material 110 and the filling material 120 are downwardly extruded from the opening 26 in the form of an elongated product 100, in which the casing 110 envelops the filling 120.

During this adhesion operation, the casing material 110 is smoothly fed to the adhesion section 31 because the scraper 47 rotates relative to the peripheral surface of the duct 27 to prevent the casing material 110 from adhering to the peripheral surface of the duct. In other words, a large volume of the elongated product 100 can be extruded, and the number and quality produced of the elongated product 100 can be increased.

It will be recognized that the use of the spiral form of the scraper 47 is useful to generate the downward thrust it imparts to the casing material 110 while it rotates relative to the peripheral surface of the duct 27. This downward thrust helps of the casing material 110 to be extruded into the adhesion section 31, and helps more elongated products 100 to be produced.

It will also be recognized that the use of a pitch for the scraper 47 that progressively increases from the upper end to the lower end is useful to progressively increase the downward thrust acting on the casing material 110 from the upper end to the lower end. This means that the feed rate of the casing material 110 and the quantity of the casing material 110 extruded from the outer outlet 25 can be increased.

The elongated product 100 that is extruded from the opening 26 then passes to the cutting apparatus 7. The cutting apparatus 7 cuts the elongated product 100 to form the special products 200, in which the filling 120 is completely encrusted with the casing 110.

The cut products 200 drop onto the continuous belt 53 of the conveyor apparatus 9 and are conveyed to the releasing location 55.

While a single spiral scraper 47 is disclosed, it will be understood that other scraper types, such as a plurality of linear scrapers, the length of each of which is parrallel to the length of the duct 27, may be utilized in the working of the present invention. In this alternative approach, the linear scrapers may be provided around the peripheral surface of the duct 27 in a spaced relation to one another.

If only the elongated cylindrical product 100 needs to be produced, then as a modification, the feeding apparatus 5 and conveyor apparatus 9 can be used, eliminating the cutting apparatus 7 from the encrusting apparatus 1; in such a modification the conveyor apparatus 9 may be provided at a suitable location for conveying the elongated product 100.

It will be apparent for those skilled in the art that various modifications and variations may be made to the present invention without departing from its spirit. Thus, it is intended that the scope of the present invention cover modifications and variations thereof, provided they come within the spirit of the appended claims.

What is claimed is:

1. An apparatus for producing a cylindrically enveloped food product in which an outer material envelops an inner material, wherein the materials are viscous food materials, said apparatus comprising:

first feeding means, having a first outlet located at the lower end thereof, for receiving the outer material and for feeding the outer material to said outlet, wherein the outer material is rotated within said first feeding means while the outer material is fed to said first outlet;

second feeding means, having a second outlet surrounded by said first feeding means near said first outlet in a substantially coaxial relation, for feeding the inner material to said second outlet, said second feeding means further including at least a portion, which includes said second outlet and an outer surface, received within said first feeding means, wherein the inner material is rotated while the inner material is fed to said second outlet;

scraping means for scraping the outer material from said outer surface of said portion of said second feeding means, said scraping means being rotatable relative to said outer surface of said portion of said second feeding means;

means for variably adjusting the rotating velocity of the inner material relative to the rotating velocity of the outer material; and adhering means for causing the outer material from said first outlet and the inner material from said second outlet to adhere to each other by utilizing their viscosity so as to form the cylindrical enveloped product in which the outer material envelops the inner material in a substantially coaxial relation, and for extruding the cylindrical enveloped product from said adhering means.

2. The apparatus as in claim 1, wherein said scraping means has a spiral configuration so as to generate a downward thrust acting on the outer material within said first feeding means from said scraping means by the rotation of said scraping means relative to said outer surface of said portion of said second feeding means.

3. The apparatus as in claim 2, wherein the pitch of said scraping means progressively increases from the upper portion of said scraping means to the lower portion of said scraping means.

4. The apparatus as in claim 1, wherein said first feeding means includes a plurality of vertical rollers arranged in a substantially circular array at substantially regular intervals, wherein the axis of rotation of each said roller is tilted in a direction toward the outside of said circular array in such a way that an inner space surrounded by said circularly arrayed rollers forms a substantially inverted cone-shaped cavity for receiving the outer material.

5. The apparatus as in claim 4, wherein each said roller has a substanially cone-shaped form whose upper end has a radius greater than that of the lower end.

6. The apparatus as in claim 4, wherein each said roller has a plurality of elongated slots provided on the peripheral surface thereof longitudinally of each said roller.

7. The apparatus as in claim 4, wherein said axis of said roller is also tilted in a direction perpendicular to said direction.

8. The apparatus as in claim 1, further comprising means for cutting the cylindrical enveloped product so as to form a plurality of substantially spherical products wherein in each product the outer material encrusts the inner material.

9. A method for feeding and extruding a cylindrical enveloped food product in which an outer material envelops an inner material, wherein the materials are viscous food materials, said method comprising steps of:

feeding the outer material while rotating the outer material in a cavity formed in a rotating body;

feeding the inner material while rotating the inner material in a rotating duct, which includes at least a portion located in said rotating cavity, wherein an outer surface of said portion is in contact with the outer material during said step of feeding the outer material, wherein the fed inner material is surrounded by the fed outer material;

scraping the outer material from said outer surface of said portion of said rotating duct during said steps of feeding said materials;

variably adjusting the rotating velocity of the inner material relative to the rotating velocity of the outer material;

causing the fed outer material to adhere to the fed inner material by utilizing their viscosity so as to form the cylindrical enveloped product in which the fed outer material envelops the fed inner material in a substantially coaxial relation, and extruding the cylindrical enveloped product.

10. The method as in claim 9, further comprising a step of cutting the cylindrical enveloped product so as to form a plurality of substantially spherical products wherein in each product the outer material encrusts the inner material.

11. An apparatus for producing encrusted food products in which an outer material encrusts an inner material, wherein the materials are viscous food materials, said apparatus comprising:

first feeding means, having a first outlet located at the lower end thereof, for receiving the outer material and for feeding the outer material to said first outlet, wherein the outer material is rotated within said first feeding means while the outer material is fed to said first outlet;

second feeding means, having a second outlet surrounded by said first outlet in a substantially coaxial relation, for feeding the inner material to said second outlet, said second feeding means further including at least a portion, which includes said second outlet and an outer surface, received within said first feeding means, wherein the inner material is rotated within said portion while it is fed to said second outlet;

scraping means for scraping the outer material from said outer surface of said portion of said second feeding means within said first means, said scraping means being rotatable relative to said outer surface of said portion of said second feeding means;

means for variably adjusting the rotating velocity of the inner material relative to the rotating velocity of the outer material;

adhering means for causing the outer material from said first outlet to adhere to the inner material from said inner outlet by utilizing their viscosity so as to form a cylindrical enveloped product in which the outer material envelops the inner material in a substantially coaxial relation, and for extruding the cylindrical enveloped product from said adhering means; and means for cutting the cylindrical enveloped product so as to form a plurality of encrusted products wherein in each product the outer material encrusts the inner material.

12. The apparatus as in claim 11, wherein said scraping means has a spiral configuration so as to generate a downward thrust acting on the outer material within said first feeding means by the rotation of said scraping means relative to said outer surface of said portion of said second feeding means.

13. The apparatus as in claim 12, wherein the pitch of said scraping means progressively increases from the upper portion of said scraping means to the lower portion of said scraping means.

14. The apparatus as in claim 11, wherein said first feeding means includes a plurality of vertical rollers arranged in a substantially circular array at substantially regular intervals, wherein the axis of rotation of each said roller is tilted in a direction toward the outside of said cavity in such a way that an inner space surrounded by said circularly-arrayed rollers is a substantially inverted cone-shaped cavity for receiving the outer material.

15. The apparatus as in claim 14, wherein each said roller has a substantially cone-shaped form whose upper end has a radius greater than that of the lower end.

16. The apparatus as in claim 14, wherein each said roller has a plurality of elongated slots provided on the peripheral surface thereof longitudinally of each said roller.

17. The apparatus as in claim 14, wherein said axis of each said roller is also tilted in a direction perpendicular to said direction.

* * * * *